July 10, 1956     C. E. BLACKMAN ET AL     2,753,979
ELEVATING CONVEYOR

Filed July 11, 1951     3 Sheets-Sheet 1

Inventors
Charles E. Blackman
Kent G. Blackman
by Parker & Carter
Attorneys

July 10, 1956
C. E. BLACKMAN ET AL
2,753,979
ELEVATING CONVEYOR
Filed July 11, 1951
3 Sheets-Sheet 2
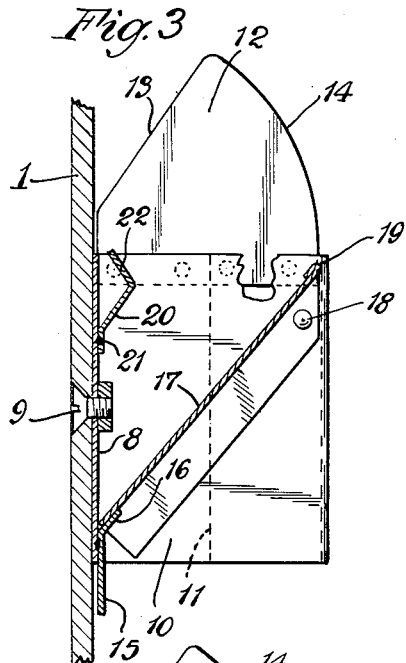
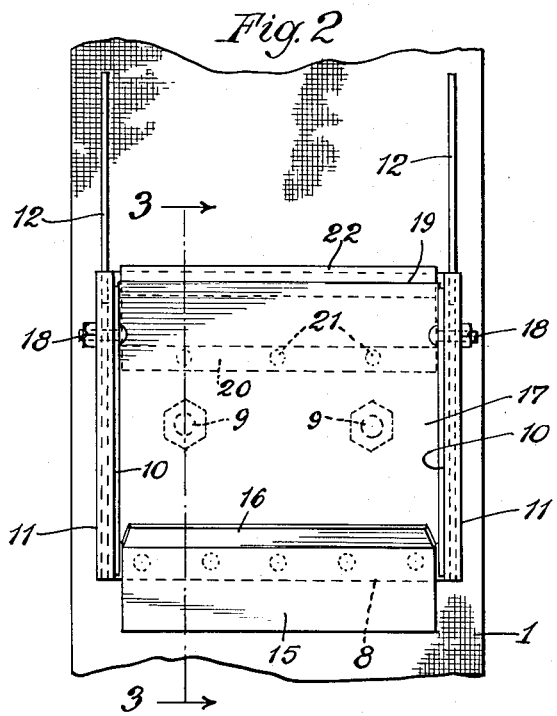
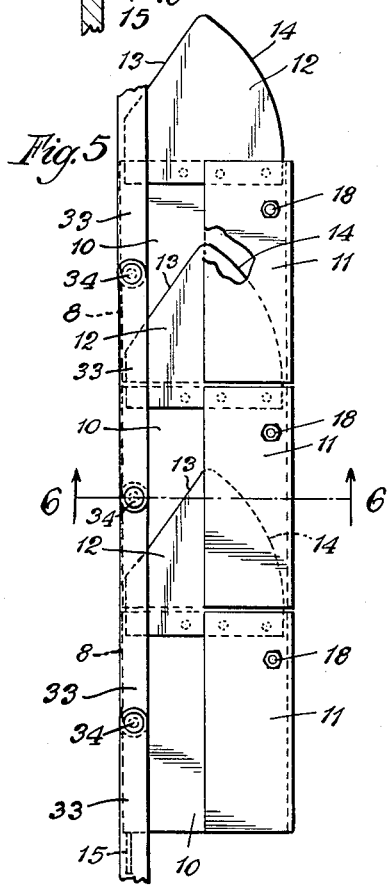
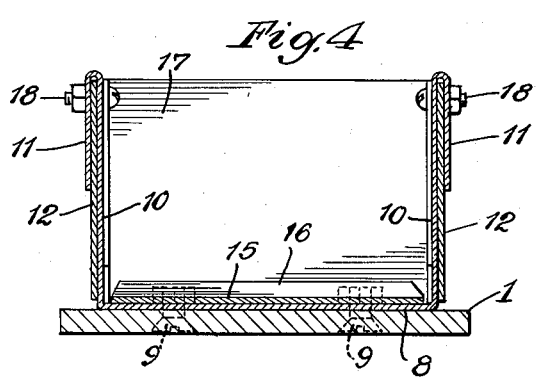
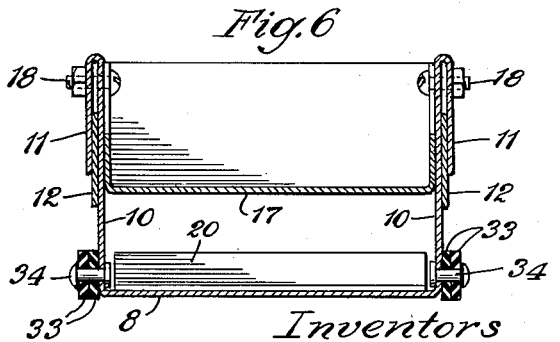
Inventors
Charles E. Blackman
Kent G. Blackman
by Parker & Carter
Attorneys

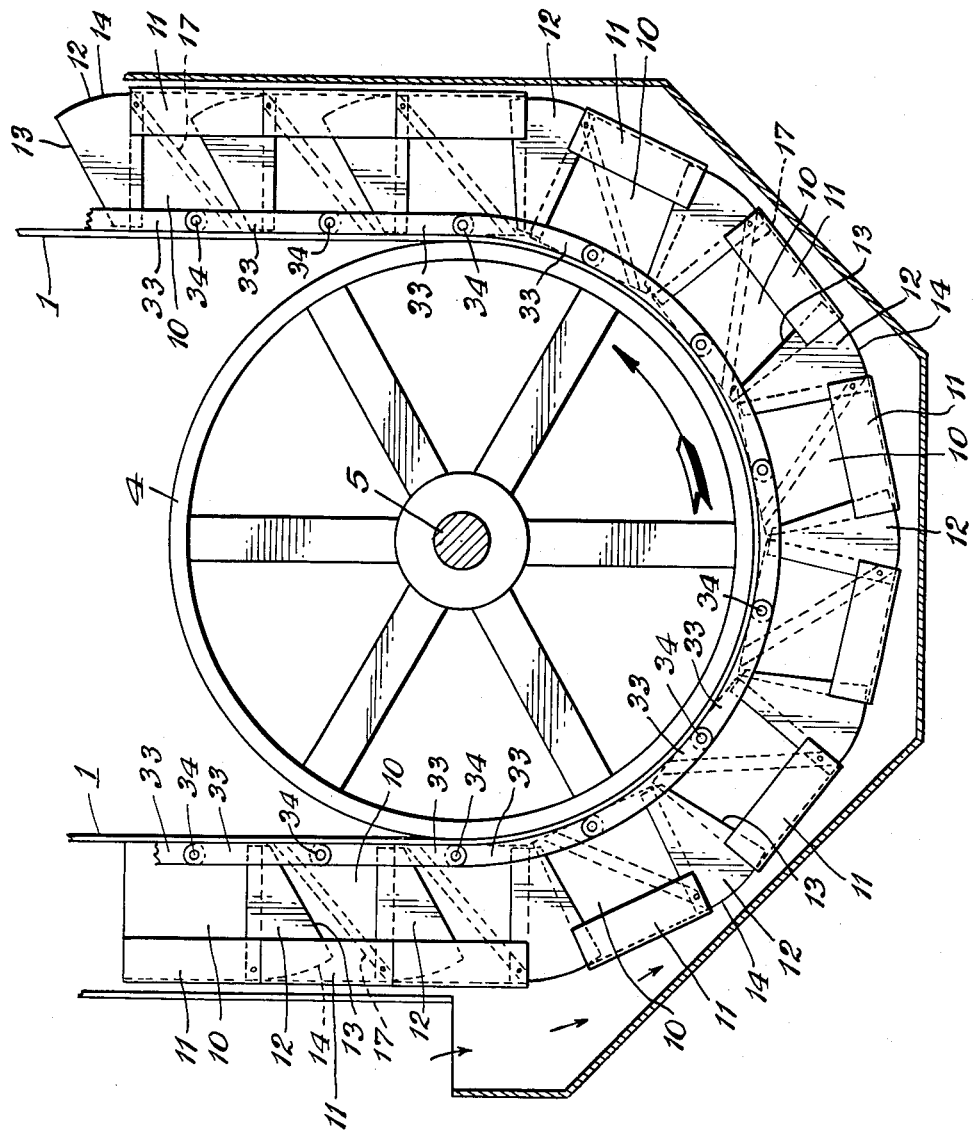

2,753,979

ELEVATING CONVEYOR

Charles E. Blackman, Waterman, and Kent G. Blackman, Sycamore, Ill., assignors to De Kalb Agricultural Association, Inc., De Kalb, Ill., a corporation of Delaware Application July 11, 1951, Serial No. 236,256

4 Claims. (Cl. 198—141)

This invention relates to an elevating conveyor and has for one object to provide a conveyor adapted to convey relatively finely divided and easily broken material.

Another object is to provide a conveyor of the type indicated which, although handling breakable and friable material, will do so safely and without breakage or damage.

Another object is to provide a conveyor of the type indicated which will adequately and safely raise and convey the material being handled without breakage or damage of any sort and without spillage. Among the types of material which may be readily handled by the conveyor of the present invention are seeds, nutmeats, coffee beans, brittle pellets, and brittle articles of small size and generally frangible and friable materials.

It is the general object of the invention to provide a conveyor for handling, conveying or raising such materials without damage.

Other objects will appear from time to time throughout the specification and claims.

The invention is illustrated more or less diagrammatically in the accompanying drawings, wherein:

Fig. 2 is an enlarged front view of a portion of the conveyor;

Fig. 3 is a section taken at line 3—3 of Fig. 2;

Fig. 4 is a sectional detail taken at line 4—4 of Fig. 1;

Fig. 5 is a side elevation of a portion of a modified form of the device; and

Fig. 6 is a transverse section of the device of Fig. 5 taken on an enlarged scale at line 6—6; and Figure 7 is a side elevation illustrating the device of Figures 5 and 6 in operative position.

Figure 1:
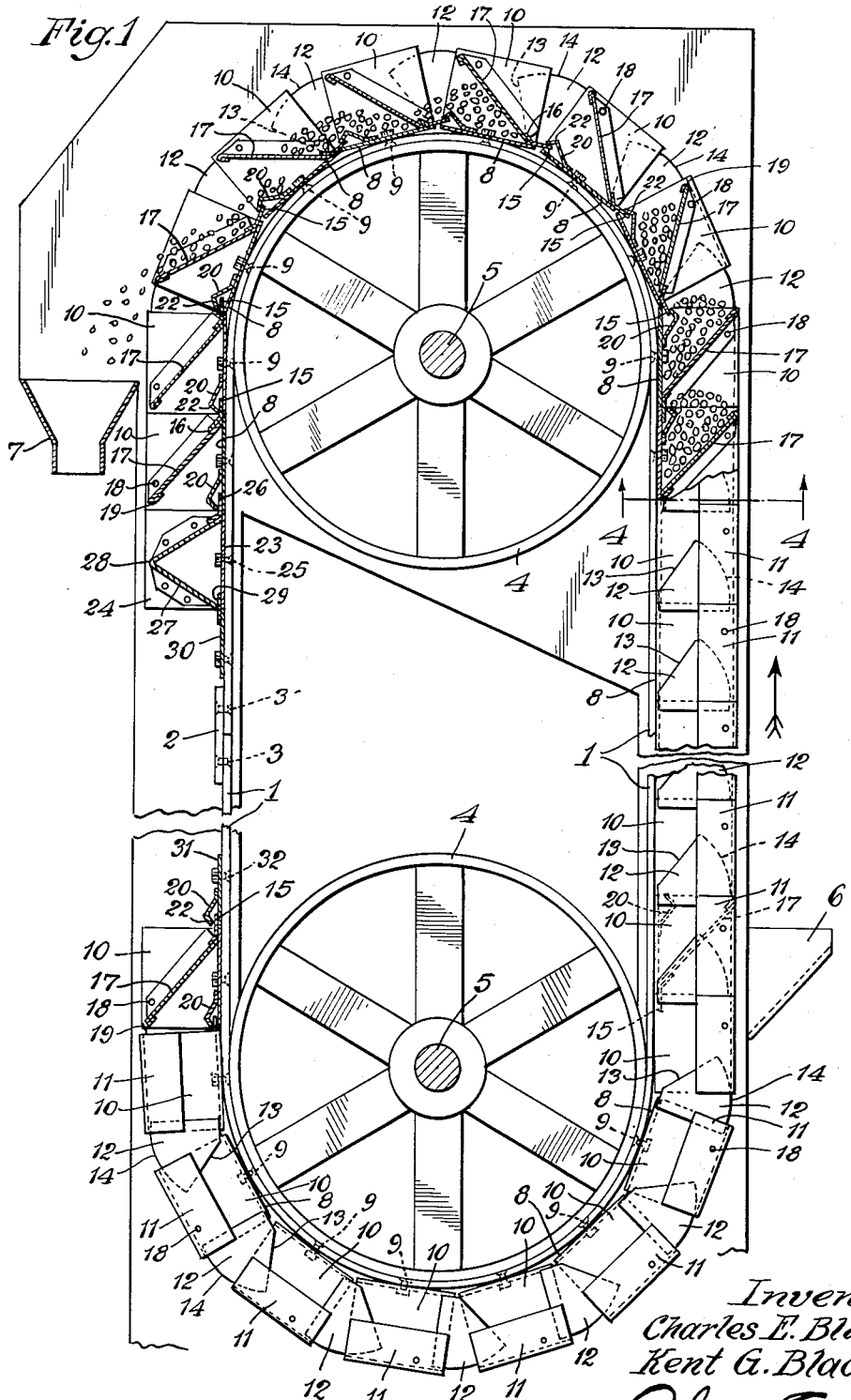
Fig. 1 is a side elevation of one form of the device, with parts in section and parts broken away.

Like parts are indicated by like symbols throughout the specification and claims.

As illustrated herewith, the invention in the first form comprises generally a belt which may conveniently be made of fabric, but may be made of other material, if desired. To the belt are fixed a number of bucket members and the buckets are shaped to inter-fit, and side closing parts are provided to prevent spilling, and are so made that adjacent buckets and bucket parts may move with respect to each other without providing gaps for the escape of material and without damage to the material within them.

As shown, 1 is a belt. It is shown as being formed of fabric but it might equally well be formed of leather or any material or mixture of composition of materials of sufficient strength and lasting quality to justify its use in a belt. The belt is made endless and the ends may be splined or otherwise fastened together as shown, and splining piece 2 overlaps the adjacent ends of the belt and is riveted to them as at 3, 3. The belt is positioned about pulleys 4 which are carried by shafts 5 and may be conventional in design. One of the pulleys is driven and the other made idle. The invention is not limited to any particular pulley arrangement or means for driving the pulleys.

The conveyor of this invention is not limited to any particular feed and discharge means and only so much of these features is shown as is useful for an understanding of the application of the conveyor. Thus 6 indicates diagrammatically a feed chute suitable for use in connection with a belt moving in the direction of the arrow of Fig. 1. After full buckets have passed over the upper pulley 5, they discharge into a receiving chute 7 which is indicated diagrammatically in Fig. 1. This chute is directed to any desired point. It may be used for filling containers, it may be directed to a storage bin or a feeding mechanism, or it may discharge upon another conveyor.

The conveyor comprises generally a plurality of buckets of identical construction and shape. One of such buckets is shown in longitudinal section in Fig. 3. It is shown in front elevation in Fig. 2 and in transverse section in Fig. 4. The bucket, as shown in detail in Figs. 2, 3 and 4, comprises a bottom portion 8 which is secured to the belt 1 by bolts 9, or otherwise. The bucket is provided with side portions 10 which, as a matter of economy and strength, would be integral with the bottom portion 8. The side portions 10 will also be normally bent downwardly and outwardly as at 11 to provide enclosed spaces or slots. As seen particularly in Fig. 4, the portion 11 is spaced sufficiently away from the adjacent portion 10 to provide a slot within which a part of an adjacent bucket is received. Fastened to each bucket side portion 10 or made integral with it, if desired, is an extension 12. As shown in particular in Fig. 3, the extension is cut away along that edge which is adjacent to the belt 1 to provide an inclined portion 13. It is also given an arcuate shape 14 along its opposite edge. It is the portions 12 of each bucket extension which fit into the slots or spaces formed by the members 10 and 11 of each preceding bucket. In this manner the bucket side portions cooperate to provide a continuous side wall for the bucket and, as shown particularly in Fig. 1, when the buckets are relatively rotated with respect to each other upon passing around a pulley the portions 11 are moved partially out of the slots in which they have previously been positioned and they still overlap sufficiently with the side portions 10 of the respective buckets to provide a continuous wall space and to prevent spillage of the contents of the buckets.

Each bucket is also provided at what may be called its rear or following edge with an extension 15. This extension is provided with an upwardly or outwardly directed portion 16. This portion extends upwardly or outwardly away from the belt 1. Each bucket is provided also with a load-carrying part 17 which is positioned between the sides 10 and abuts against the bottom 8 and engages the portion 16 and may be secured to it. Actually, it is ordinarily not necessary to secure the portion 17 to the portion 16. The member 17 may be fastened to the bucket side portions by bolts or rivets 18, if desired, and it is preferably inwardly bent upon itself, as at 19, to provide a smooth edge which will not damage the contents of the bucket.

Each bucket is also provided with a socket forming member 20 shown in section in Fig. 3. This member is fastened to the bottom portion 8 of each bucket by welding 21 or otherwise, and is provided with an upwardly directed portion as shown and an inwardly directed portion 22 which extends toward but stops short of the bottom portion 8. As shown in Fig. 1, each extension 15 fits into the space provided between the bottom 8 of adjacent bucket and the socket forming member 20 of that bucket. This construction by providing the interfitting of the extensions 15 with the socket forming parts 20, produces a continuous bottom for the conveyor as a whole and prevents the development of gaps between adjacent buckets when they pass over or around a pulley.

To provide for the necessary adjustments of the belt and to permit the proper sizing of a conveyor to a given installation, it is frequently necessary to provide an interruption between the buckets, that is to say, it is not always possible using buckets of a standard size to prepare and assemble a conveyor in which the buckets will precisely fit together so that the whole length of the conveyor is made up of carrying buckets of identical size and shape. To provide for the situation where variation is necessary, a lead bucket may be used and the trailing bucket may be fastened in a manner different from that above described. The lead bucket as shown in Fig. 1 is in fact not a bucket at all, is arranged to carry no load and will not receive any load. As shown, this bucket comprises a buttom 23 preferably identical in size and shape with the portions 8 of the load carrying buckets. It may, of course, be of other sizes. It has side portions 24 extending upwardly and shaped to provide spaces for the reception of the extensions 12 of an adjacent bucket. It is fastened to the belt by rivets or bolts 25 preferably the same as the rivets or bolts 9, and it is provided on its trailing edge with a rearward extension 26 which is the same or the equivalent of the rearward extensions 15 of the load carrying buckets and this extension 26 is as shown in Fig. 1 received under the member 20 of the adjacent bucket.

Positioned within the lead bucket is a member 27 of generally V-shaped cross section. It is arranged to the apex 28 of the V extending outwardly away from the belt 1. This member refuses a load and if a load is discharged upon it it merely at once re-discharges the load back into the feed chute or elsewhere and the bucket thus does not at any time retain any load. At its forward end it receives a connection member 29 which is carried on a plate 30. The connection member 29 is in a sense the equivalent of the members 15 and it fits between the bottom 23 and the forward leg of the V-shaped member 27. The lead bucket is thus positioned on the belt and retained in movable position with respect to the belt by means which are identical with or equivalent of the means used for the load carrying buckets to the belt.

Since the trailing bucket cannot be engaged by the lead bucket in most installations another means is provided for engaging the trailing end of the trailing bucket. This comprises a plate 31 which is fastened to the belt 1 by rivets 32 or otherwise. There is secured to the leading edge of the plate 31 a member 20 which is identical with the other members 20 applied to the load carrying buckets described above. The extension 15 of the trailing bucket extends under the member 20 and between it and the plate 31. Thus the trailing bucket is received and held movably to the belt in the same manner as are all the other load-carrying buckets.

As shown in Figures 5 and 6, the bucket and bucket parts are identical with those described above, and they will not be redescribed. Under certain circumstances, when the conveyor is to be loaded on the down leg; that is to say, on the descending side of the belt by running the buckets through a bin or other member containing material to be loaded, it is desirable to cover the openings which develop when the buckets take the position shown at the bottom and top of Figure 1. The belt will conform to the members 4 but space will develop where the bucket bottoms are tangential to the belt. Rubber bars or links 33 are positioned along the device, and they fit over studs 34 riveted or otherwise fastened to the side of the bucket. These rubber bars or links are preferably slightly shorter than the distance between the center points of the buckets, and they are under some tension. Their function is to close the gap which occurs when the bucket ends leave the periphery of the belt as it moves about the wheels 4. Because these members are made of rubber or rubber-like material, reinforced or not, as desired, they bend and stretch and conform to the shape of the wheels 4 and cover the gaps formed as above mentioned and as illustrated in Figure 7.

Although we have shown an operative form of our invention, it will be recognized that many changes in the form, shape and arrangement of parts may be made without departing from the spirit of the invention, and our showing is, therefore, to be taken as, in a sense, diagrammatic. In particular, the buckets might, if desired, be carried by a chain rather than by a belt.

The use and operation of the invention are as follows:

With the parts assembled generally as shown, the device comprises a pair of pulleys or a pair of sprockets or a pulley and a sprocket, and about these rotary members, one of which is driven, there is positioned a conveyor.

The conveyor comprises a chain or a belt and to this are secured a plurality of buckets. The buckets are secured to the belt or chain at their mid-point from front to rear, and are otherwise free for relevant movement with respect to the chain. Each bucket is provided with wing-like portions which inter-fit with an adjacent bucket. Hinge portions are provided between the bottoms of the buckets and there is a substantial degree of overlap at these hinge points as shown, for example, in Fig. 1. The hinge points thus provide for relative tilting movement of adjacent buckets and also provide for the stretch and shrink of a belt or a chain. A substantial degree of stretch or shrink may occur without causing the extensions 15 to be disengaged from the members 20, 22. These hinge members thus serve not merely to assure a continuous and uninterrupted bottom for the conveyor bucket assembly, but they also compensate for expansion and contraction of the belt or chain. The hinge sections are also arranged to accomplish satisfactory discharge. Thus at the discharge portion of the conveyor, as illustrated in the upper left-hand corner of Fig. 1, the hinge members 20, 22 overlap the extensions 15 and provide a continuous bottom surface along the buckets so that material is not damaged or broken and cannot fall into the space between adjacent buckets, but flows freely and continuously along the bottom portion 8 of one bucket over the hinge member 20, 22 over a portion of the extension 15 of an adjacent bucket and finally over what may be called the bucket of the member 17 of the adjacent bucket and is discharged into the hopper 7.

The device as shown may be operated thru a wide range of speeds. Because of the continuous bucket arrangement described and illustrated, there is no critical speed at which the belt or chain of the present conveyor must run. Material is not lost or improperly discharged from the conveyor even if it is run at high speed. Because there is no loss of material during running, satisfactory capacity is attained when running at speeds lower than are normally acceptable with standard conveyors. This is due, in part, to the fact that the conveyor will assure delivery of practically 100% of the material received, since spilling and improper discharge are eliminated. Gravity is relied upon for discharge and centrifugal force is unnecessary. A gentle pick-up and a gentle discharge are thus made possible.

As shown at the lower right-hand corner of Fig. 1, the material is received within each bucket after the bucket leaves the lower wheel or pulley, and the intake spout or feed member 6 is preferably slightly narrower than the bucket. The intake flow thru the feed spout 6 is controlled by any desired means not shown in proper relation to the conveyor capacity.

The angle or slant of the member 17 within the bucket is governed by the nature of material to be handled, although any given angle may be satisfactory for a substantial variety of materials. Slow running materials ordinarily are better handled by a bucket which is shallower in relation to its length than is permissible for rapid running material. This factor is taken into consideration in the design and adaptation of a conveyor to any particular conveying problem.

We claim:

1. In an elevating conveyor, a continuous flexible bucket carrier arranged for travel about at least two spaced rotary parts, a plurality of individual substantially identical buckets, each said bucket comprising a bottom wall having a flat portion secured at one point of said bucket to the outer face of said carrier and free elsewhere whereby said bucket is free to articulate with respect to said carrier as said carrier travels about said rotary parts, said bucket having spaced side walls having portions which overlap the side-walls of the adjacent bucket and a load-supporting wall extending therebetween at an arcute angle from said bottom wall, said bottom wall having a rear edge portion extending rearwardly from said load-supporting wall and a forwardly open socket at its forward edge, said rear edge portion of each of said buckets being received within the socket of the succeeding bucket at all relative positions of said buckets for pivotal and slidable movement therewithin to provide a continuous supporting surface for the material carried in the buckets.

2. The structure of claim 1 characterized by and including a load-refusing member secured to said carrier between a pair of said buckets and comprising a bottom wall, a pair of spaced side walls, and a load-refusing wall joining said side walls, said load-refusing wall being generally V-shaped and having its apex directed outwardly from said bottom wall.

3. The structure of claim 1 characterized by and including flexible strip members extending between and secured to each pair of adjacent buckets along the outer, lower sides thereof to mask the space between said carrier and opposed forward and rear edges of said buckets when said carrier is flexed, said strip members being free to conform to the arc of said carrier as said carrier travels about said rotary members.

4. The structure of claim 1 wherein said forwardly open socket includes a dam portion extending outwardly at an acute angle from said bottom wall and an inwardly inclined lip portion at the outer end of said dam portion, said bottom rear edge portion being received between said lip and bottom wall of each succeeding bucket to provide a continuous supporting surface for the material carried in the buckets, said dam and lip portions forming together a dam intermediate the ends of said continuous surface over which the material is caused to flow at point of discharge.

References Cited in the file of this patent

UNITED STATES PATENTS

| | | |
|---|---|---|
| 266,082 | Boardman | Oct. 17, 1882 |
| 289,635 | Farrington | Dec. 4, 1883 |
| 437,506 | Otten | Sept. 30, 1890 |
| 732,499 | Austin | June 30, 1903 |
| 878,650 | Manning | Feb. 11, 1908 |
| 1,357,919 | While et al. | Nov. 2, 1920 |
| 1,432,076 | Mellin | Oct. 17, 1922 |
| 1,824,756 | Welser | Sept. 22, 1931 |
| 2,370,531 | Gemeny | Feb. 27, 1945 |
| 2,510,212 | Donnell | June 6, 1950 |

FOREIGN PATENTS

| | | |
|---|---|---|
| 2,861/88 | Great Britain | Feb. 25, 1888 |
| 352,226 | Germany | Apr. 5, 1921 |